(12) United States Patent
Kumar et al.

(10) Patent No.: US 11,888,899 B2
(45) Date of Patent: Jan. 30, 2024

(54) FLOW-BASED FORWARDING ELEMENT CONFIGURATION

(71) Applicant: NICIRA, INC., Palo Alto, CA (US)

(72) Inventors: Vasantha Kumar, Pune (IN); Sandeep Kasbe, Pune (IN); Nidhi Sharma, Pune (IN); Vaibhav Rekhate, Pune (IN); Sriram Gopalakrishnan, Pune (IN)

(73) Assignee: Nicira, Inc., Palo Alto, CA (US)

( * ) Notice: Subject to any disclaimer, the term of this patent is extended or adjusted under 35 U.S.C. 154(b) by 651 days.

(21) Appl. No.: 15/915,096

(22) Filed: Mar. 8, 2018

(65) Prior Publication Data

US 2019/0230126 A1 Jul. 25, 2019

(30) Foreign Application Priority Data

Jan. 24, 2018 (IN) .............................. 201841002924

(51) Int. Cl.
*H04L 9/40* (2022.01)
*H04L 49/00* (2022.01)
*H04L 47/20* (2022.01)
*H04L 45/00* (2022.01)
*H04L 67/12* (2022.01)

(52) U.S. Cl.
CPC .............. *H04L 63/20* (2013.01); *H04L 45/38* (2013.01); *H04L 47/20* (2013.01); *H04L 49/70* (2013.01); *H04L 63/0263* (2013.01); *H04L 63/0272* (2013.01); *H04L 67/12* (2013.01)

(58) Field of Classification Search
CPC ..... H04L 63/20; H04L 63/0263; H04L 45/38; H04L 47/20; H04L 49/70; H04L 63/0272; H04L 67/12; H04L 69/326; H04L 45/74; H04L 45/64
See application file for complete search history.

(56) References Cited

U.S. PATENT DOCUMENTS

| 7,596,614 | B2 * | 9/2009 | Saunderson | ........ H04L 12/4641 |
| | | | | 370/338 |
| 7,764,612 | B2 * | 7/2010 | Manuja | ................... H04L 47/20 |
| | | | | 370/231 |
| 8,510,551 | B1 * | 8/2013 | Desai | .................. H04L 63/0236 |
| | | | | 713/163 |

(Continued)

*Primary Examiner* — Oleg Korsak
(74) *Attorney, Agent, or Firm* — King Intellectual Asset Management

(57) ABSTRACT

Example methods are provided for flow-based forwarding element configuration in a network environment. An example method may comprise obtaining a set of security policies associated with the group of workloads; and based on the set of security policies, identifying an allowed forwarding path between a destination and a first workload. The method may also comprise configuring a whitelist set of flow entries and sending configuration information to the flow-based forwarding element to cause the flow-based forwarding element to apply the whitelist set. The whitelist set may include a first flow entry specifying match fields and a first action to allow communication over the allowed forwarding path, but excludes a second flow entry specifying a second action to block communication over a forbidden forwarding path between the destination and the second workload. The match fields may include transport layer information and network layer information.

24 Claims, 9 Drawing Sheets

(56) References Cited

U.S. PATENT DOCUMENTS

| | | | |
|---|---|---|---|
| 8,693,344 B1* | 4/2014 | Adams | H04L 41/0893 |
| | | | 370/241 |
| 8,789,135 B1* | 7/2014 | Pani | H04L 63/0209 |
| | | | 370/229 |
| 8,856,384 B2* | 10/2014 | Jiang | H04L 61/2528 |
| | | | 709/202 |
| 9,071,529 B2* | 6/2015 | Garg | H04L 47/12 |
| 9,288,555 B2* | 3/2016 | Srinivas | H04L 41/12 |
| 9,419,910 B2* | 8/2016 | Yamagata | H04L 49/505 |
| 9,461,967 B2* | 10/2016 | Zuk | H04L 45/38 |
| 9,525,696 B2* | 12/2016 | Kapoor | H04L 67/306 |
| 9,571,382 B2* | 2/2017 | Li | H04L 45/18 |
| 9,582,308 B2* | 2/2017 | Masurekar | G06F 9/45558 |
| 9,871,703 B2* | 1/2018 | Cortes Gomez | H04L 63/0435 |
| 9,917,860 B2* | 3/2018 | Senanayake | G06F 3/16 |
| 9,930,010 B2* | 3/2018 | Sun | H04L 63/0227 |
| 10,038,671 B2* | 7/2018 | Mihelich | H04L 63/162 |
| 10,116,696 B2* | 10/2018 | Porras | H04L 63/20 |
| 10,225,234 B2* | 3/2019 | Nenov | H04L 63/0236 |
| 10,291,654 B2* | 5/2019 | Banerjee | H04L 63/1425 |
| 10,375,121 B2* | 8/2019 | Hamou | H04L 63/0263 |
| 10,587,502 B2* | 3/2020 | Sharma | H04L 65/1006 |
| 10,728,109 B1* | 7/2020 | Hu | H04L 41/0813 |
| 10,885,211 B2* | 1/2021 | Teal | G06F 21/55 |
| 11,153,184 B2* | 10/2021 | Yadav | H04L 45/507 |
| 11,425,007 B2* | 8/2022 | Gupta | H04L 43/20 |
| 2007/0083924 A1* | 4/2007 | Lu | H04L 63/0227 |
| | | | 726/13 |
| 2007/0192500 A1* | 8/2007 | Lum | H04L 61/103 |
| | | | 709/230 |
| 2008/0109679 A1* | 5/2008 | Wright | H04L 63/102 |
| | | | 714/37 |
| 2008/0189769 A1 | 8/2008 | Casado et al. | |
| 2016/0261457 A1* | 9/2016 | Gupta | H04W 76/18 |
| 2017/0230284 A1* | 8/2017 | Yamashita | H04L 45/38 |
| 2018/0262533 A1* | 9/2018 | McCaig | H04L 63/20 |
| 2019/0080078 A1* | 3/2019 | Teal | H04L 63/0227 |
| 2019/0230126 A1* | 7/2019 | Kumar | H04L 45/64 |
| 2020/0228486 A1* | 7/2020 | Park | H04L 61/4511 |

* cited by examiner

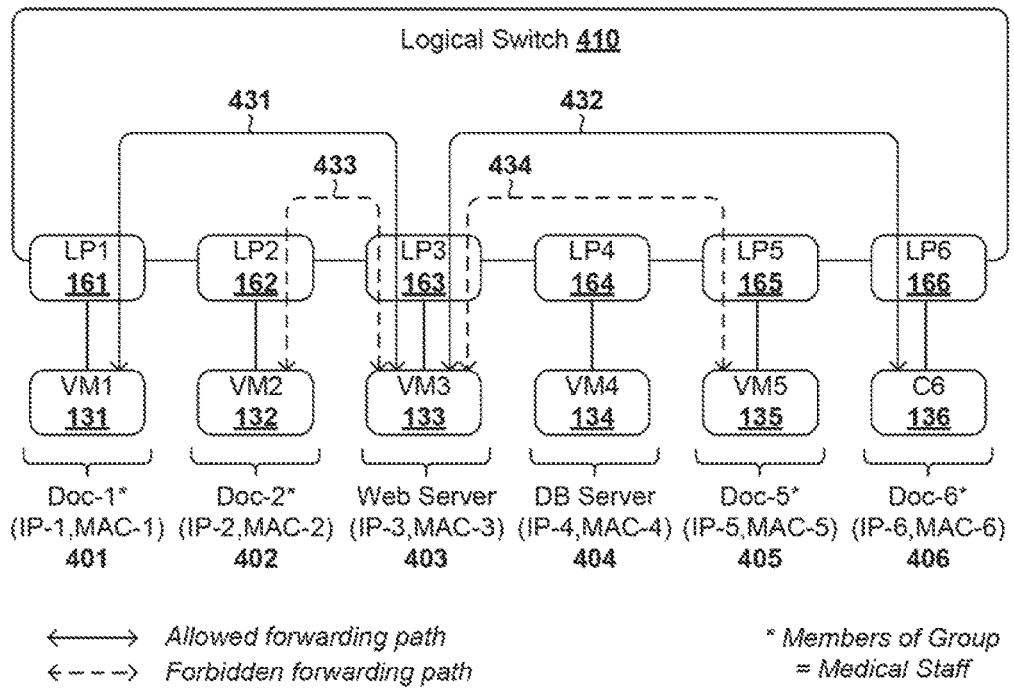

400

← → Allowed forwarding path
← - - → Forbidden forwarding path

\* Members of Group = Medical Staff

Set of security policies 420

| Priority | Source | Destination | Allow or Block | |
|---|---|---|---|---|
| Low | Medical Staff | Web Server | Allow | ~ 421 |
| High | Doc-2, Doc-5 | Web Server | Block | ~ 422 |

Whitelist set of flow entries 440

| Match fields | Action | |
|---|---|---|
| ct_state=-trk,tcp,in_port=LP1, nw_src=IP-1,nw_dst=IP-3,tp_src=8080 | output:LP3 (i.e., forward) | ~ 441 |
| ct_state=-trk,tcp,in_port=LP3, nw_src=IP-3,nw_dst=IP-1,tp_src=8080 | output:LP1 (i.e., forward) | ~ 442 |
| ct_state=-trk,tcp,in_port=LP6, nw_src=IP-6,nw_dst=IP-3,tp_src=8080 | output:LP3 (i.e., forward) | ~ 443 |
| ct_state=-trk,tcp,in_port=LP3, nw_src=IP-3,nw_dst=IP-6,tp_src=8080 | output:LP6 (i.e., forward) | ~ 444 |

Flow entries for broadcast packet handling

| Match fields | Action | |
|---|---|---|
| table=0,udp, tp_src=68 | CONTROLLER:65535 | 710 |
| arp,arp_tpa= IP-1 | load:0x2->NXM_OF_ARP_OP[],mod_dl_src:MAC-1, move:NXM_OF_ETH_SRC[]->NXM_OF_ETH_DST[], move:NXM_NX_ARP_SHA[]->NXM_NX_ARP_THA[], move:NXM_OF_ARP_SPA[]->NXM_OF_ARP_TPA[], mod_dl_src:MAC-1,load:MAC-1->NXM_NX_ARP_SHA[], load:IP-1->NXM_OF_ARP_SPA[],IN_PORT | 711 |
| arp,arp_tpa= IP-2 | load:0x2->NXM_OF_ARP_OP[],mod_dl_src:MAC-2, move:NXM_OF_ETH_SRC[]->NXM_OF_ETH_DST[], move:NXM_NX_ARP_SHA[]->NXM_NX_ARP_THA[], move:NXM_OF_ARP_SPA[]->NXM_OF_ARP_TPA[], mod_dl_src:MAC-2,load:MAC-2->NXM_NX_ARP_SHA[], load:IP-2->NXM_OF_ARP_SPA[],IN_PORT | 712 |
| arp,arp_tpa= IP-3 | load:0x2->NXM_OF_ARP_OP[],mod_dl_src:MAC-3, move:NXM_OF_ETH_SRC[]->NXM_OF_ETH_DST[], move:NXM_NX_ARP_SHA[]->NXM_NX_ARP_THA[], move:NXM_OF_ARP_SPA[]->NXM_OF_ARP_TPA[], mod_dl_src:MAC-3,load:MAC-3->NXM_NX_ARP_SHA[], load:IP-3->NXM_OF_ARP_SPA[],IN_PORT | 713 |
| arp,arp_tpa= IP-4 | load:0x2->NXM_OF_ARP_OP[], move:NXM_OF_ETH_SRC[]->NXM_OF_ETH_DST[], move:NXM_NX_ARP_SHA[]->NXM_NX_ARP_THA[], move:NXM_OF_ARP_SPA[]->NXM_OF_ARP_TPA[], mod_dl_src:MAC-4,load:MAC-4->NXM_NX_ARP_SHA[], load:IP-4->NXM_OF_ARP_SPA[],IN_PORT | 714 |
| arp,arp_tpa= IP-5 | load:0x2->NXM_OF_ARP_OP[], move:NXM_OF_ETH_SRC[]->NXM_OF_ETH_DST[], move:NXM_NX_ARP_SHA[]->NXM_NX_ARP_THA[], move:NXM_OF_ARP_SPA[]->NXM_OF_ARP_TPA[], mod_dl_src:MAC-5,load:MAC-5->NXM_NX_ARP_SHA[], load:IP-5->NXM_OF_ARP_SPA[],IN_PORT | 715 |
| arp,arp_tpa= IP-6 | load:0x2->NXM_OF_ARP_OP[], move:NXM_OF_ETH_SRC[]->NXM_OF_ETH_DST[], move:NXM_NX_ARP_SHA[]->NXM_NX_ARP_THA[], move:NXM_OF_ARP_SPA[]->NXM_OF_ARP_TPA[], mod_dl_src:MAC-6,load:MAC-6->NXM_NX_ARP_SHA[], load:IP-6->NXM_OF_ARP_SPA[],IN_PORT | 716 |

Fig. 7

FLOW-BASED FORWARDING ELEMENT CONFIGURATION

RELATED APPLICATIONS

Benefit is claimed under 35 U.S.C. 119(a)-(d) to Foreign Application Serial No. 201841002924 filed in India entitled "FLOW-BASED FORWARDING ELEMENT CONFIGURATION", on Jan. 24, 2018, by NICIRA, INC., which is herein incorporated in its entirety by reference for all purposes.

BACKGROUND

Unless otherwise indicated herein, the approaches described in this section are not admitted to be prior art by inclusion in this section.

Virtualization allows the abstraction and pooling of hardware resources to support virtual machines in a Software-Defined Networking (SDN) environment, such as a Software-Defined Data Center (SDDC). For example, through server virtualization, virtualization computing instances such as virtual machines running different operating systems may be supported by the same physical machine (e.g., referred to as a "host"). Each virtual machine is generally provisioned with virtual resources to run an operating system and applications. The virtual resources may include central processing unit (CPU) resources, memory resources, storage resources, network resources, etc. To protect hosts against security threats, a firewall engine may be deployed on each hypervisor to protect the virtual machines. However, in practice, constructing a set of firewall rules for the firewall engine, or designing a network topology for security policy adherence, may be a complex task.

BRIEF DESCRIPTION OF DRAWINGS

FIG. 4 is a schematic diagram illustrating a first example of flow-based forwarding element configuration in an SDN environment;

FIG. 7 is a schematic diagram illustrating example flow entries for handling broadcast packets in an SDN environment;

DETAILED DESCRIPTION

Figure 1:
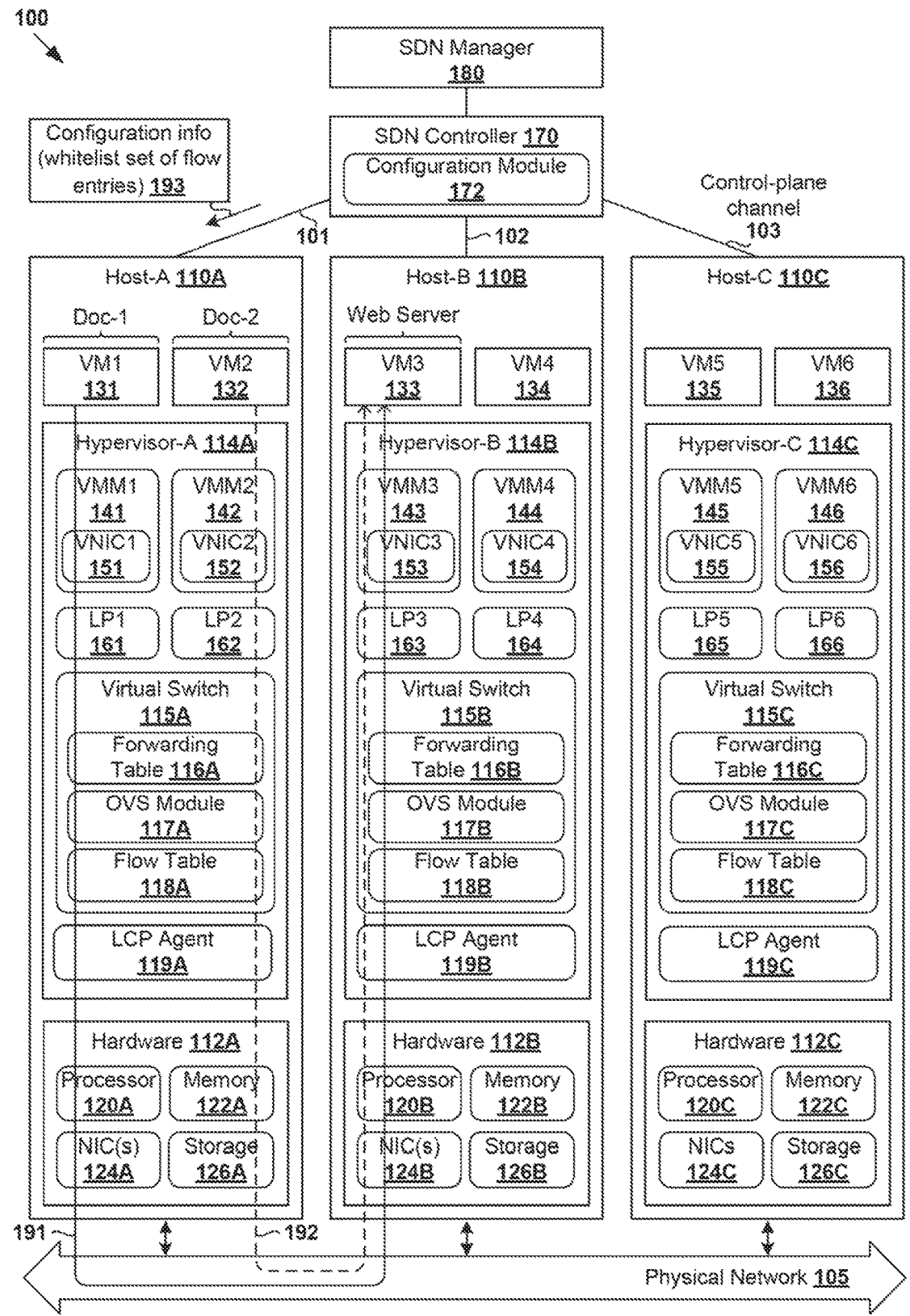
FIG. 1 is a schematic diagram illustrating an example Software-Defined Networking (SDN) environment in which flow-based forwarding element configuration may be performed.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Various challenges relating to network security will now be explained in more detail using FIG. 1, which is a schematic diagram illustrating example Software-Defined Networking (SDN) environment in which flow-based forwarding element configuration may be performed. It should be understood that, depending on the desired implementation, examples of the present disclosure may be implemented in any suitable network environment other than SDN environment 100. In practice, SDN environment 100 may include additional and/or alternative components than that shown in FIG. 1.

In the example in FIG. 1, SDN environment 100 includes multiple hosts, such as host-A 110A, host-B 110B and host-C 110C that are inter-connected via physical network 105. Each host 110A/110B/110C includes suitable hardware 112A/112B/112C and virtualization software (e.g., hypervisor-A 114A, hypervisor-B 114B, hypervisor-C 114C) to support various virtual machines (VMs) 131-136. For example, host-A 110A supports VM1 131 and VM2 132; host-B 110B supports VM3 133 and VM4 134; and host-C 110C supports VM5 135 and VM6 136. In practice, SDN environment 100 may include any number of hosts (also known as a "host computers", "host devices", "physical servers", "server systems", "transport nodes," etc.), where each host may be supporting tens or hundreds of VMs. Hypervisors 114A-C may each implement any suitable virtualization technology, such as VMware ESX® or ESXi™ (available from VMware, Inc.), Kernel-based Virtual Machine (KVM), etc.

Hypervisor 114A/114B/114C maintains a mapping between underlying hardware 112A/112B/112C and virtual resources allocated to respective VMs 131-136. Hardware 112A/112B/112C includes suitable physical components, such as central processing unit(s) or processor(s) 120A/120B/120C; memory 122A/122B/122C; physical network interface controllers (NICs) 124A/124B/124C; and storage disk(s) 126A/126B/126C, etc. Virtual resources are allocated to each VM to support a guest operating system (OS) and applications (not shown for simplicity). Corresponding to hardware 112A/112B/112C, the virtual resources may include virtual CPU, virtual memory, virtual disk, virtual network interface controller (VNIC), etc. Hardware resources may be emulated using virtual machine monitors (VMMs) 141-146, which may be considered as part of corresponding VMs 131-136, or alternatively, separated from VMs 131-136. In the example in FIG. 1, VNICs 151-156 are emulated by corresponding VMMs 141-146. Although one-to-one relationships are shown, one VM may be associated with multiple VNICs (each VNIC having its own network address).

Virtual switch 115A/115B/115C maintains forwarding information to forward packets to and from corresponding VMs 131-136. Packets are received from, or sent to, each VM via an associated logical port. For example, logical ports 161-166 are associated with respective VMs 131-136.

The term "packet" may refer generally to a group of bits that can be transported together, and may be in another form, such as "frame", "message", "segment", etc. The term "layer-2" may refer generally to a link layer or Media Access Control (MAC) layer; "layer-3" to a network layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

As used herein, the term "logical port" may refer generally to a port on a logical switch to which a virtualized computing instance is connected. A "logical switch" may refer generally to an SDN construct that is collectively implemented by virtual switches 115A-C in the example in FIG. 1, whereas a "virtual switch" may refer generally to a software switch or software implementation of a physical switch. In practice, there is usually a one-to-one mapping between a logical port on a logical switch and a virtual port on virtual switch 115A/115B/115C. However, the mapping may change in some scenarios, such as when the logical port is mapped to a different virtual port on a different virtual switch after migration of the corresponding virtualized computing instance (e.g., when the source and destination hosts do not have a distributed virtual switch spanning them).

Although examples of the present disclosure refer to virtual machines, it should be understood that a "virtual machine" running on a host is merely one example of a "virtualized computing instance" or "virtual workload." A virtualized computing instance may represent an addressable data compute node or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system. The term "hypervisor" may refer generally to a software layer or component that supports the execution of multiple virtualized computing instances, including system-level software in guest VMs that supports namespace containers such as Docker, etc.

Through SDN, benefits similar to server virtualization may be derived for networking services. For example, logical networks may be provided that are decoupled from the underlying physical network infrastructure, and therefore may be provisioned, changed, stored, deleted and restored programmatically without having to reconfigure the underlying physical hardware. SDN controller 170 and SDN manager 180 are example network management entities that facilitate implementation of logical networks in SDN environment 100. One example of an SDN controller is the NSX controller component of VMware NSX® (available from VMware, Inc.) that may be a member of a controller cluster (not shown) and configurable using SDN manager 180. One example of an SDN manager is the NSX manager component that provides an interface for end users to perform any suitable configuration in SDN environment 100.

SDN controller 170 and SDN manager 180 operate on a central control plane and a management plane, respectively. To send and receive the control information (e.g., configuration information), each host 110A/110B/110C may implement local control plane (LCP) agent 119A/119B/119C to interact with SDN controller 170. For example, control-plane channel 101/102/103 may be established between SDN controller 170 and host 110A/110B/110C using TCP over Secure Sockets Layer (SSL), etc. Network management entity 170/180 may be implemented using physical machine(s), virtual machine(s), a combination thereof, etc.

Conventionally, to protect host 110A/110B/110C against security threats caused by unwanted packets, hypervisors 114A-C implement respective firewall engines to filter packets to and from respective VMs 131-136. The firewall engines form a distributed firewall that implements firewall rules, which are configurable using network management entities 170-180. However, in practice, constructing a set of firewall rules for the firewall engines can be a complex task. For example, firewall complexity is generally due to rule precedence, which defines an order according to which firewall rules should be executed or applied. This is because some firewall rules have a higher priority over, and therefore override, other firewall rules.

In the example in FIG. 1, a first firewall rule may specifically block VM2 132 to communicate with VM3 133, but a second firewall rule allows all members of a group (e.g., VMs 131-134 in a "Medical Staff" group) to communicate with VM3 133. If the second firewall rule is ordered and executed before the first firewall rule, VM2 132 will be erroneously allowed to communicate with VM3 133, thereby exposing SDN environment 100 to security attacks by malicious third parties. Although rule precedence is important for security policy adherence, it also increases the complexity of conventional firewall implementation. This problem is exacerbated when there are hundreds or thousands of workloads that need to adhere to different security policies designed by security administrators.

Flow-Based Forwarding Element Configuration

According to examples of the present disclosure, the complexity of network security configuration and implementation may be reduced in SDN environment 100. Instead of using firewall rules that necessitate a complex order of precedence, a flow-based forwarding element may be configured to apply a "whitelist" set of flow entries that each specify match fields, and an action to allow communication over an allowed forwarding path.

As used herein, the term "flow-based forwarding element" may refer generally to any suitable forwarding element that is configurable to perform packet handling according to flow entries stored in a flow table. As will be described further below, the match fields of a flow entry may include transport layer information and network layer information to facilitate flow entry matching up to a transport layer level (or above) by the flow-based forwarding element. Examples of the present disclosure should be contrasted against conventional firewall rules that necessitate matching up to the network layer level only, which in turn requires rule precedence and increases complexity.

In practice, the flow-based forwarding element may be a hardware forwarding element or a software forwarding element. For example, a software forwarding element operates within virtualization software of physical host 110A/110B/110C (e.g., hypervisor 114A/114B/114C, VMM, host OS kernel, etc.). In another example, a hardware forwarding element may be a physical network device (e.g., physical switch, physical router, etc.), such as implemented using application-specific integrated circuits (ASICs) that are specifically designed to support in-hardware forwarding, etc.

In the example in FIG. 1, Open vSwitch (OVS) is an example flow-based forwarding element implemented by virtual switch 115A/115B/115C, such as using OVS module 117A/117B/117C and flow entries stored in flow table 118A/118B/118C. In this case, SDN controller 170 may configure or program virtual switch 115A/115B/115C using any suitable protocol, such as OpenFlow protocol (a trademark of the Open Networking Foundation), etc. Depending on the desired implementation, configuring a flow-based forwarding element may involve configuring a particular virtual switch (e.g., 115A) to update a flow table (e.g., 118A) accessible by an OVS module (e.g., 117A). In practice, OVS module 117A/117B/117C may include any suitable user space and/or kernel space components (not shown in FIG. 1 for simplicity). Multiple OVS modules 117A-C at respective virtual switches 115A-C across hosts 110A-C may implement a logical overlay network (e.g., Virtual eXtensible Local Area Network (VXLAN), etc.) to allow VMs 131-136 to participate in a broadcast network.

Figure 8:
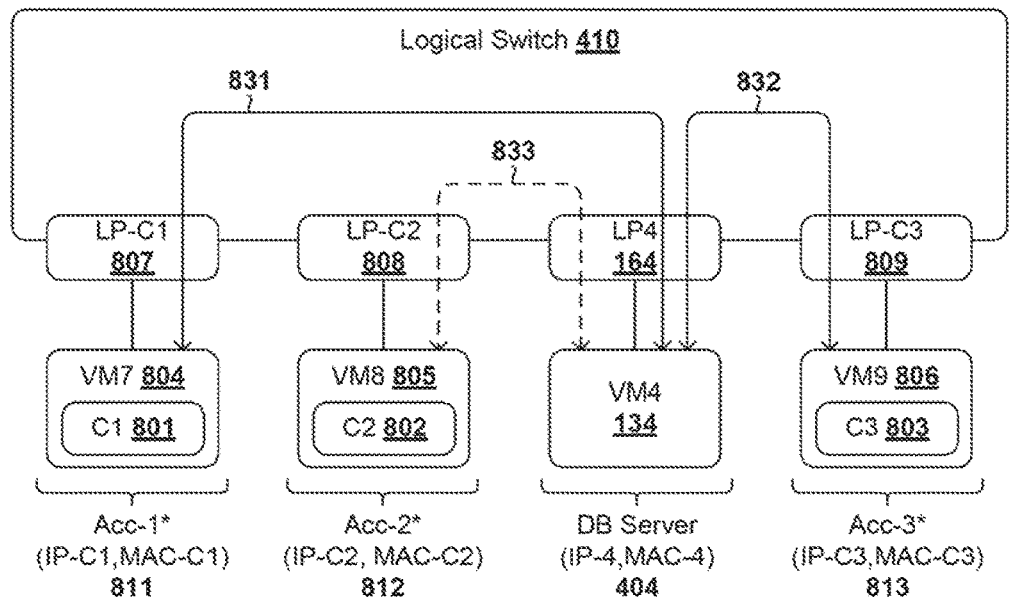
FIG. 8 is a schematic diagram illustrating example flow-based forwarding element configuration in an SDN environment with containers.

As used herein, the term "workload" may refer generally to a node (e.g., source node, destination node, etc.) participating in a communication flow, such as using TCP, UDP, etc. In some examples, a "workload" may be a virtual workload, such as a virtual machine (e.g., VMs 131-136), container (to be discussed using FIG. 8), any other form of a virtualized computing instance, etc. In some other examples, a "workload" may be a physical workload, such as physical devices, etc.

Figure 2:
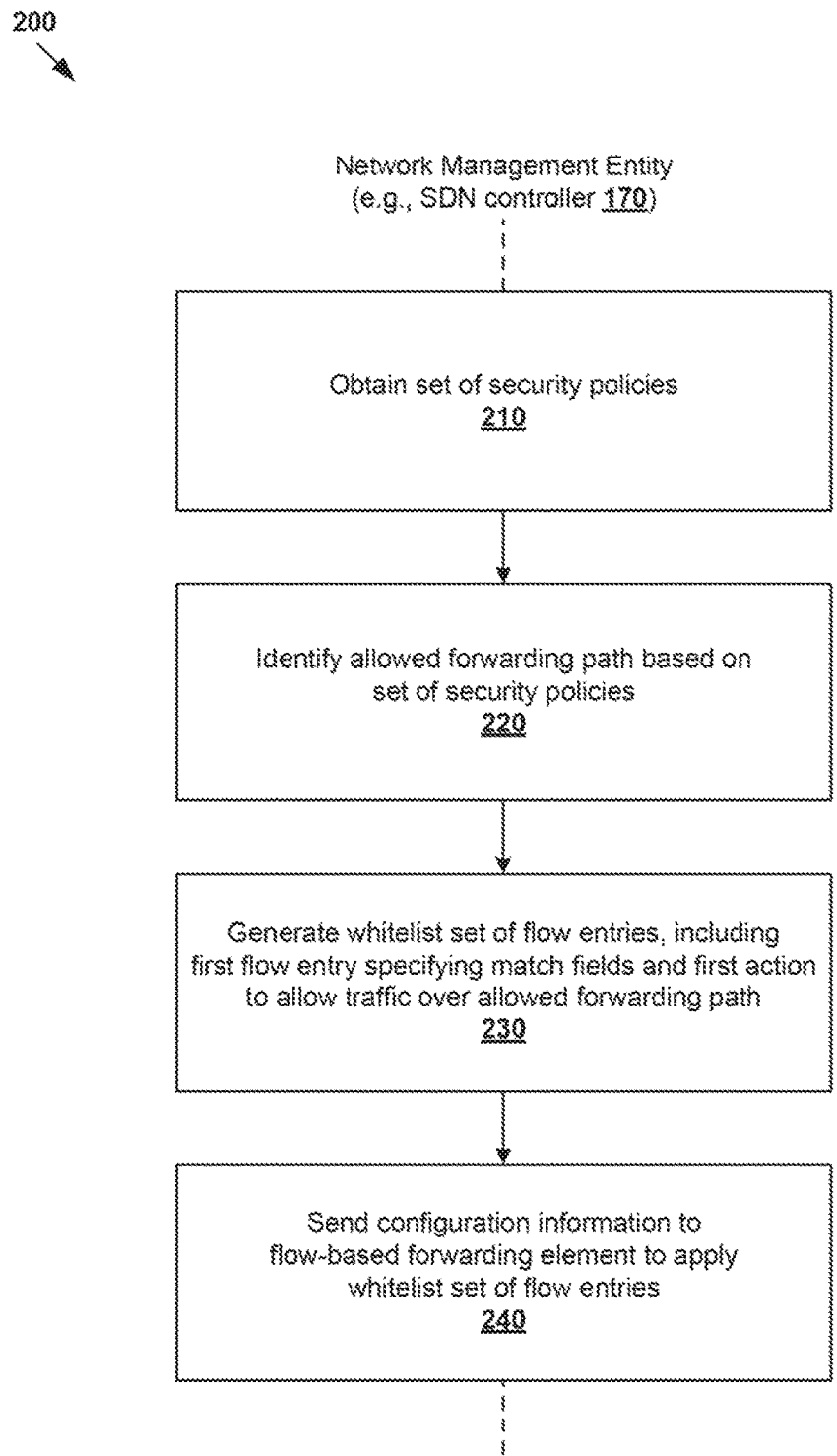
FIG. 2 is a flowchart of an example process for a network management entity to perform flow-based forwarding element configuration in an SDN environment.

In more detail, FIG. 2 is a flowchart of example process 200 for a network management entity to perform flow-based forwarding element configuration in SDN environment 100. Example process 200 may include one or more operations, functions, or actions illustrated by one or more blocks, such as 210 to 240. The various blocks may be combined into fewer blocks, divided into additional blocks, and/or eliminated depending on the desired implementation. In the following, an example will be described using SDN controller 170 as an example "network management entity," VM1 131 as an example "first workload," VM2 132 as an example "second workload," VM3 133 as an example "destination," and virtual switch 115A at host-A 110A as an example "flow-based forwarding element," etc. Example process 200 may be implemented using SDN controller 170, such as using configuration module 172, etc.

At 210 in FIG. 2, SDN controller 170 obtains a set of security policies associated with a group of workloads that include VM1 131 and VM2 132. Here, the term "obtaining" may refer generally to receiving or retrieving the set of security policies from any suitable source, such as SDN manager 180, storage device, etc. For example, the set of security policies may allow communication between destination=VM3 133 and first workload=VM1 131, but block communication between VM3 133 and second workload=VM2 132. As will be described further using FIGS. 3-5, the set of security policies may be a hierarchical set arranged in an order of precedence. For example, a second policy (e.g., higher priority level) that blocks communication between VM2 132 and VM3 133 may take precedence over a first policy (e.g., lower priority level) that allows the same communication.

At 220 and 230 in FIG. 2, SDN controller 170 identifies an allowed forwarding path between VM3 133 and VM1 131 based on the set of security policies, and configures a "whitelist" set of flow entries. For example, the whitelist set may include a first flow entry specifying match fields and a first action to allow communication over the allowed forwarding path (see 191 in FIG. 1), but excludes a second flow entry specifying a second action to block communication over a forbidden forwarding path between VM2 132 and destination VM3 133 (see 192 in FIG. 1).

The match fields in the first flow entry may include transport layer information and network layer information to facilitate flow entry matching of up to a transport layer (or above). In practice, the transport layer information may specify a transport layer protocol (e.g., TCP), a source port number and/or a destination port number, etc. The network layer information may specify a first network address assigned to VM1 131 and a second network address assigned to VM3 133, etc. Depending on the desired implementation, the match fields may further include port information (e.g., input port to which VM1 131 is connected to the flow-based forwarding element), MAC layer information (e.g., source and/or destination MAC addresses), etc. By including MAC layer information in the match fields, the risk of MAC spoofing may be reduced because packets that do not have a MAC layer header with matching information will be dropped. Further, the match fields may include upper layer information (i.e., above the transport layer), such as session layer information, presentation layer information and application layer information according to the OSI model or any alternative networking model.

At 240 in FIG. 2, SDN controller 170 sends configuration information (see 193 in FIG. 1) to virtual switch 115A to cause virtual switch 115A to apply the whitelist set of flow entries. For example, in response detecting a first packet that is addressed from VM1 131 to VM3 133 and matches with the match fields specified in the first flow entry, virtual switch 115A may apply the first action to forward the first packet to VM3 133. In contrast, in response to detecting a second packet that is addressed from VM2 132 to VM3 133 and does not match with any flow entry in the whitelist set, virtual switch 115A drops the second packet.

According to examples of the present disclosure, the "whitelist" set only includes flow entries that each allow communication over an allowed forwarding path. This way, it is not necessary to configure any flow entries that specifies a block (or drop) action to explicitly block communication over a forbidden forwarding path. Absence of any matching flow entry in the whitelist set automatically causes a flow-based forwarding element to block communication over the forbidden forwarding path. Unlike conventional firewall rules, the whitelist set is a non-hierarchical set that does not need any complex order of precedence, or priority levels. Each flow entry in the whitelist set may be considered as a pinhole that allows a flow of TCP/UDP packets to pass through. Further, by configuring the flow-based forwarding element to perform stateful filtering based on flow entries, it is not necessary to implement any conventional firewall engines on hypervisors 114A-C (i.e., firewall-less).

As will be discussed using FIG. 3, FIG. 4 and FIG. 5, the first flow entry may be configured to specify any suitable match fields to be matched with information associated with packets, such as an input port (e.g., LP1 161) that connects the first workload (e.g., VM1 131) with virtual switches 115A-C, a first network address assigned to first workload (e.g., VM1 131), a second network address assigned to the second workload (e.g., VM3 133), a source port number, layer-4 protocol, etc. The match fields may also specify a connection tracking state to facilitate stateful filtering.

According to examples of the present disclosure, network topology may be simplified in SDN environment 100. As will be described using FIG. 6 and FIG. 7, a flat logical network may be deployed to connect VMs 131-136 within a single broadcast domain. In this case, SDN controller 170 may configure a third flow entry that specifies an action to handle a broadcast packet, and send configuration information to the flow-based forwarding element to cause the flow-based forwarding element to apply the third flow entry. For example, in response to detecting a broadcast packet, the action specified in the third flow entry may be performed without broadcasting the broadcast packet within the broadcast domain.

Examples of a "broadcast packet" may include address assignment requests generated using Dynamic Host Configuration Protocol (DHCP), address resolution requests generated using Address Resolution Protocol (ARP), or any network service requests that are conventionally broadcasted, etc. By suppressing the flooding of broadcast traffic using flow entries in flow tables 118A-C, network overheads may be reduced and network performance improved. Further, a malicious workload cannot sniff the broadcast traffic of another workload, which reduces network security risks relating to ARP poisoning, MAC spoofing, etc. Flow entry matching at the MAC layer level will also reduce the risk of MAC spoofing, etc.

Examples of the present disclosures may be applied in network environments with any suitable virtual workloads, physical workloads, a combination thereof. As will be described using FIG. 8, flow-based forwarding element configuration may be performed in an SDN environment with containers, etc. As will be described using FIG. 9, flow-based forwarding element configuration may be performed in an Internet of Things (IoT) network environment with workloads in the form of IoT devices, etc.

Detailed Process

Figure 3:
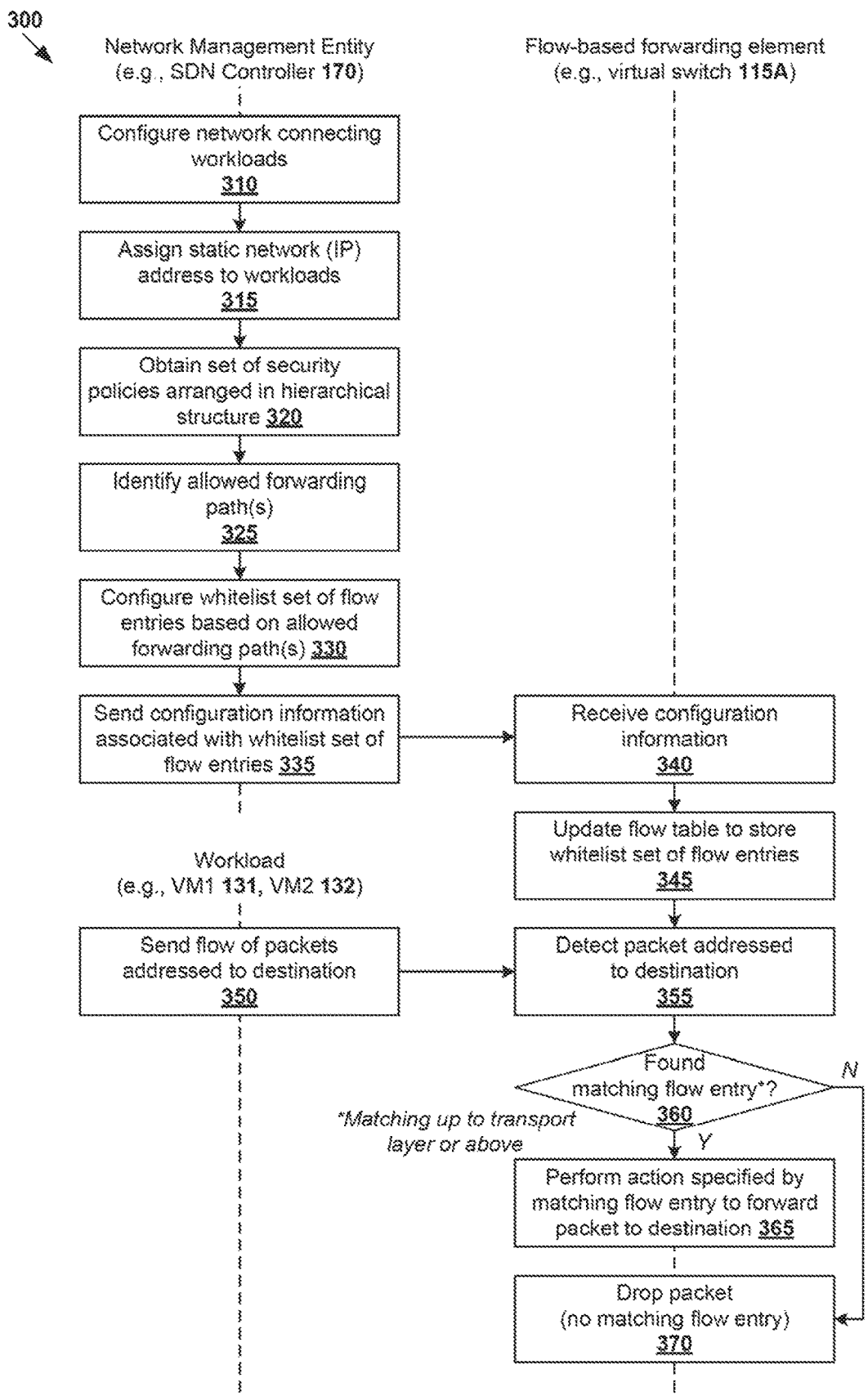
FIG. 3 is a flowchart of an example detailed process to perform flow-based forwarding element configuration in an SDN environment.

FIG. 3 is a flowchart of example detailed process 300 for flow-based forwarding element configuration in SDN environment 100. Example process 300 may include one or more operations, functions, or actions illustrated at 310 to 370. The various operations, functions or actions may be combined into fewer blocks, divided into additional blocks, and/or eliminated depending on the desired implementation. FIG. 3 will be explained using FIG. 4, which is a schematic diagram illustrating a first example of flow-based forwarding element configuration in SDN environment 100.

In the following, various examples will be described using SDN controller 170 as an example "network management entity," VM1 131 and VM6 136 as an example "first workloads," VM2 132 and VM4 134 as example "second workloads," VM3 133 and VM5 135 as example "destinations," virtual switches 115A-C as example "flow-based forwarding elements," etc. Example process 300 may be implemented using SDN controller 170 (e.g., using configuration module 172) and virtual switches 115A-C (e.g., using OVS modules 117A-C), etc.

(a) Network Topology Configuration

At 310 in FIG. 3, SDN controller 170 configures logical network 400 to connect VMs 131-136 via logical switch 410. Compared to the physical implementation view in FIG. 1, FIG. 4 represents a management plane view of how VMs 131-136 are represented internally and connected via logical network 400 that is decoupled from the underlying physical network 105. According to examples of the present disclosure, logical switch 410 provides layer-4 connectivity among VMs 131-136 in logical network 400. It should be understood that is not necessary for logical network 400 to provide any layer-2 and/or layer-3 connectivity among VMs 131-136. As such, unlike conventional approaches, it is not necessary to configure a hierarchical set of firewall rules that rely on rule precedence and a generic, layer-3 rule to block traffic. In practice, logical switch 410 may be implemented in a distributed manner and can span hosts 110A-C supporting VMs 131-136. More specifically, logical switch 410 may be represented internally using forwarding tables 116A-C maintained by respective virtual switches 115A-C, which collectively implement logical switch 410. Logical switch 410 is connected to VMs 131-136 via respective logical ports 161-166.

At 315 in FIG. 3, SDN controller 170 performs static IP address assignment by assigning a static IP address to each VM. Using network=10.10.10.0/24 as an example, IP-1=10.10.10.1 may be assigned to VM1 131 (see 401), IP-2=10.10.10.2 to VM2 132 (see 402), IP-3=10.10.10.3 to VM3 133 (see 403), IP-4=10.10.10.4 to VM4 134 (see 404), IP-5=10.10.10.5 to VM5 135 (see 405) and IP-6=10.10.10.6 to VM6 136 (see 406). In the example in FIG. 4, logical network 400 is a flat network with pre-defined, static IP addresses. The simpler network topology should be contrasted against conventional approaches that rely on a complex array of logical switches and logical routers to provide layer-2 and layer-3 isolation.

(b) Network Security Configuration

At 320 in FIG. 3, SDN controller 170 obtains a set of security policies (see 420 in FIG. 4) associated with VMs 131-136. Security policies 421-422 are configured for a healthcare enterprise, particularly users assigned with role="Medical Staff." VM1 131 is operated by user="Doc-1" (see 401), VM2 132 by "Doc-2" (see 402), VM5 135 by "Doc-5" (see 405) and "VM6 136 by Doc-6" (see 406). In practice, the term "role" may refer generally to a job function (or any suitable title) that describes the authority and responsibility conferred on a user assigned with the role within an organization, etc. A "user" may be a human (e.g., employee) or non-human (e.g., bot) user. VM3 133 and VM4 134 are respective web server (see 403) and database server (see 404) whose access is controlled using security policies 421, 422.

At 325 in FIG. 3, SDN controller 170 identifies allowed forwarding paths in SDN environment 100 based on security policies 421-422. In the example in FIG. 4, security policies 421-422 are arranged in an order of precedence. Second policy 422 has a higher priority level (see "Priority" field) compared to a lower priority level assigned to first policy 421. Based on the priority levels, second policy 422 that blocks communication from VM2 132 (i.e., "Doc-2") or VM5 135 (i.e., "Doc-5") to VM3 133 (i.e., web server) takes precedence over first policy 421, which allows communication between all "Medical Staff" members and VM3 133.

Based on security policies 421-422 and their order of precedence, two allowed forwarding paths 431-432 are identified. First forwarding path 431 is between VM1 131 and VM3 133, and second forwarding path 432 between VM6 136 and VM3 133 (shown in full line). Other forwarding paths are forbidden, including third forwarding path 433 between VM2 132 and VM3 133, and fourth forwarding path 434 between VM5 135 and VM3 133 (shown in dotted line).

At 330 in FIG. 3, SDN controller 170 configures a whitelist set flow entries (see 440 in FIG. 4) based on the allowed forwarding paths. Unlike the hierarchical set of security policies, the set of flow entries is non-hierarchical and does not assign any priority levels to flow entries 441-444. Each flow entry specifies "match fields" that include transport layer information and network layer information to be matched to a packet, and "actions" to be performed if there is a match. A "flow" may represent a set of packets having common header information, such as network layer information (e.g., source IP address, destination IP address), transport layer information (e.g., source TCP/UDP port, destination TCP/UDP port, and protocol), any combination thereof, etc.

In the example in FIG. 4, based on first allowed forwarding path 431, flow entries 441-442 are configured to allow communication from VM1 131 to VM3 133, and vice versa. First flow entry 441 specifies the following fields: "ct_state=−trk" (i.e., connection tracking state), "tcp" (i.e., TCP packet), in_port="LP1" (i.e., input port=LP1 161), nw_src=IP-1 (i.e., source IP address), nw_dst=IP-3 (i.e., destination IP address) and tp_src=8080 (i.e., source TCP port). If a packet from VM1 131 satisfies the match fields, an action (i.e., "output: LP3") will be performed to forward or output the packet via LP3 163 to VM3 133.

Setting "ct_state=−trk" facilitates stateful filtering of a flow of packets between LP1 161 and LP3 163. In practice, a connection tracker that tracks the connection tracking state may be implemented by OVS module 117A/117B/117C. The connection tracker may trace a TCP/UDP connection state to make stateful decisions. "LP1" and "LP3" specified in first flow entry 441 represent respective logical port identifiers (IDs) of LP1 161 and LP3 163. Compared to first flow entry 421, second flow entry 442 has similar match fields and actions but in the reverse direction to allow communication from VM3 133 to VM1 131.

Similarly, based on second allowed forwarding path 432, SDN controller 170 configures flow entries 443, 444 to allow communication from VM6 136 to VM3 133, and vice versa. Third flow entry 443 specifies the following fields: ct_state=−trk, tcp, in_port="LP4" (i.e., input port=LP6 166), nw_src=IP-4, nw_dst=IP-3 and tp_src=8080. If a packet from VM6 136 satisfies the match fields, a forward action (i.e., "output:LP3") will be performed to forward the packet via LP3 163 to VM3 133. Fourth flow entry 444 has similar match fields and actions in the reverse direction to allow communication from VM3 133 to VM6 136.

As discussed using FIG. 1 and FIG. 2, whitelist set 440 only includes flow entries 441-444 associated with allowed forwarding paths 431-432. It is not necessary to arrange flow entries 441-444 according to an order of precedence, or generate any flow entry that explicitly blocks communication over forbidden forwarding paths 433-434. This way, the complexity and processing overheads associated with flow entry configuration at SDN controller 170 and application at virtual switches 115A-C may be reduced. Unlike conventional approaches that generate flow entries after packet detection (i.e., in a lazy manner), flow entries 441-444 are configured based on security policies 421-422 prior to packet detection (i.e., in a proactive or eager manner) to improve efficiency.

At 335 in FIG. 3, SDN controller 170 generates and sends configuration information (e.g., a set of instructions) to hosts 110A-C via respective control-plane channels 101-103. At 340 and 345, in response to receiving the configuration information, virtual switches 115A-C update respective flow tables 118A-C accordingly to store flow entries 441-444, or a subset thereof.

In practice, block 335 may further includes SDN controller 170 identifying target host(s) associated with flow entries 441-444. For example, since VM1 131 is supported by host-A 110A, configuration information is sent to host-A 110A to configure host-A 110A to update flow table 118A to store new entries 441-442. Also, host-C 110C is configured to update flow table 118C to store entries 443-444 associated with VM5 135. Further, since web server=VM3 133 is supported by host-B 110B, host-B 110B is configured to update flow table 118B to store new entries 441-444.

Packet handling may be performed by virtual switches 115A-C based on entries in respective flow tables 118A-C. For example, at 350, 355 and 360 in FIG. 3, in response to detecting an egress packet, virtual switch 115A/115B/115C determines whether the egress packet has a matching flow entry in flow table 118A/118B/118C. At 365 in FIG. 3, in response to determination that a matching flow entry is found, action(s) specified by the matching flow entry will be performed. Otherwise, at 370 in FIG. 3, the egress packet will be dropped because there is no matching flow entry in flow table 118A/118B/118C. Data in the egress packet may be generated by an application running inside VMs 131-136.

In a first example, virtual switch 115A at hypervisor 114A may detect an egress packet with header information (source IP address=IP-1, destination IP address=IP-3, source port=8080, protocol=TCP) from VM1 131. In this case, block 360 may involve virtual switch 115A performing several operations. First, virtual switch 115A may obtain a connection tracking state from a connection tracker to determine whether "ct_state=−trk" is satisfied. Next, virtual switch 115A may compare header information of the egress packet with match fields in a flow entry to determine whether "tcp" "nw_src=IP-1," "nw_dst=IP-3," and "tp_src=8080" are satisfied. Further, virtual switch 115A may identify an input port via which the egress packet is detected to determine whether "in_port=LP1" is satisfied. If the match fields of first flow entry 441 are satisfied, first flow entry 441 is a "matching flow entry" for the egress packet.

In another example, virtual switch 115C at hypervisor 114C may detect an egress packet with header information (source IP address=IP-6, destination IP address=IP-3, source port=8080, protocol=TCP) from VM6 136. Similarly, block 360 may involve virtual switch 115C obtaining a connection tracking state to determine whether "ct_state=−trk" is satisfied; comparing header information of the egress packet with match fields to determine whether "tcp" "nw_src=IP-6," "nw_dst=IP-3," and "tp_src=8080" are satisfied; and identifying an input port via which the egress packet is detected to determine whether "in_port=LP6" is satisfied. If the match fields are satisfied, third flow entry 443 is a matching flow entry for the egress packet.

Further, virtual switch 115A at hypervisor 114A may detect an egress packet with header information (source IP address=IP-2, destination IP address=IP-3, source port=8080, protocol=TCP) from VM2 132. In this case, since there is no matching flow entry in flow table 118A (i.e., a table miss), the egress packet will be dropped. Similarly, virtual switch 115C at hypervisor 114C may detect an egress packet with header information (source IP address=IP-5, destination IP address=IP-3, source port=8080, protocol=TCP) from VM5 135. In this case, since there is no matching flow entry in flow table 118C, the egress packet will also be dropped.

In practice, any suitable match fields may be configured. For example, a "ct" option may be configured to reach another network or Internet, such as using network address translation (NAT), etc. Referring to first flow entry 441, its "action" field may specify "actions=ct(zone=1, commit, nat(nw_src=192.168.1.2:1024-65565), exec(move: OXM_OF_IN_PORT[ ]->NXM_NX_CT_MARK[ ])), output:LP3" to translate a source IP address from IP-1 to "192.168.1.2:1024-65565." The "commit" argument is to commit the connection to the connection tracker, in which case information about the connection will be stored beyond the lifetime of the packet in the pipeline.

Figure 5:
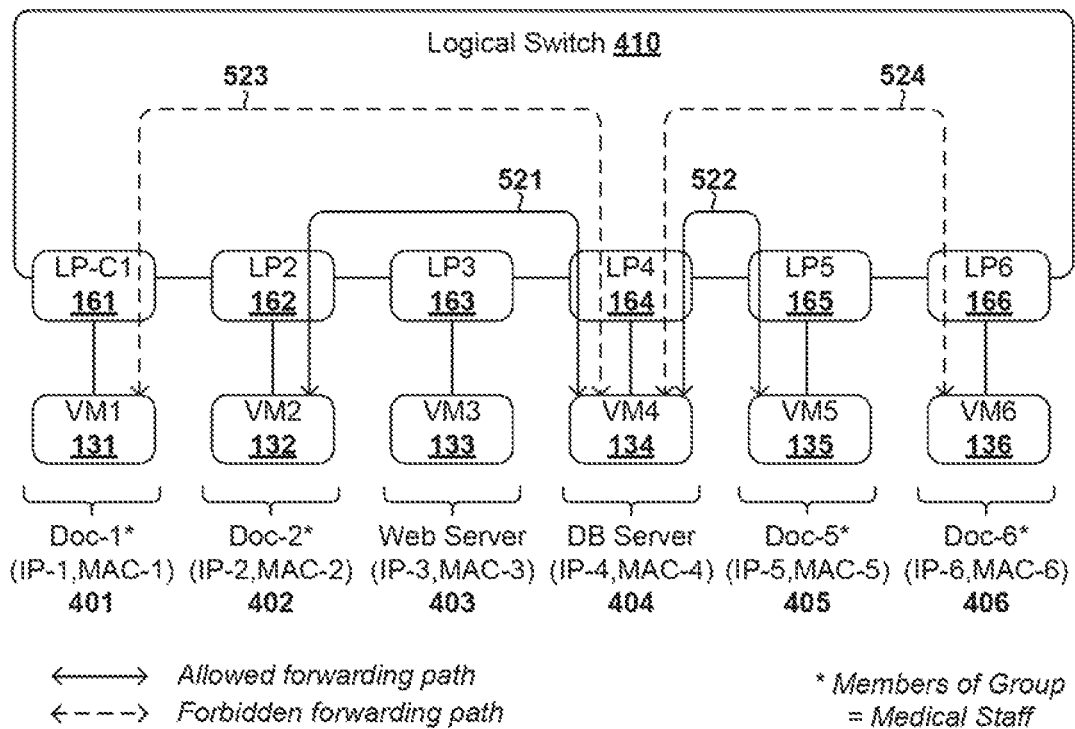
FIG. 5 is a schematic diagram illustrating a second example of flow-based forwarding element configuration in an SDN environment.

FIG. 5 is a schematic diagram illustrating a second example of flow-based forwarding element configuration in SDN environment 100. Set 420 in FIG. 4 further includes security policies 511, 512 that are arranged in a hierarchical structure. Third security policy 511 blocks communication between all members of the "Medical Staff" group and a database server (i.e., VM4 134), but fourth policy 512 allows communication between some members (i.e., "Doc-2" and "Doc-5") with the database server. Fourth security policy 512 is assigned with a higher priority level to take precedence over third security policy 511.

Based on security policies 511-512, SDN controller 170 identifies allowed forwarding paths 521-522 and configures whitelist set 440 to include flow entries 531-534 according to blocks 325-330 in FIG. 3. In particular, flow entries 531-532 are configured to provide a first allowed forwarding path (see 521) to allow bi-directional communication between VM2 132 and VM4 134. Similarly, flow entries 533-534 are configured to provide a second allowed forwarding path (see 522) to allow bi-directional communication between VM5 135 and VM4 134.

Similar to flow entries 441-444 in FIG. 4, whitelist set 440 in FIG. 5 is non-hierarchical structure and does not assign any order of precedence. Using flow entry 531 as an example, virtual switch 115A may detect an egress packet addressed from source address=IP-2 (i.e., "nw_src=IP-2") to destination address=IP-4 (i.e., "nw_dst=IP-4") via input port=LP2 162 (i.e., "in_port=LP2"). In response to determination that the egress packet matches with flow entry 531, virtual switch 115A sends the egress packet via output port=LP4 164 (i.e., "output:LP4") to VM4 134.

In contrast, no flow entry is configured to explicitly block communication over forbidden forwarding paths 523-524. If an egress packet does not match with any of flow entries 441-444, 531-534, the egress packet will be automatically dropped. For example, virtual switch 115A may detect, via input port=LP1 161, an egress packet that is addressed from source address=IP-1 to destination address=IP-4. In this case, virtual switch 115A drops the packet because there is no matching flow entry specifying match fields (in_port=LP1, nw_src=IP-1, nw_dst=IP-4).

Although not shown in FIGS. 3-5, it should be understood that packets from a source host (e.g., host-A 110A) to a destination host (e.g., host-B 110B) may be encapsulated with an outer header specifying source host address (e.g., IP-A associated with host-A 110A) and destination host address (e.g., IP-B associated with host-B 110B). At the destination host, decapsulation will be performed to remove the outer header from the encapsulated packet. The (decapsulated) packet will then be sent to the destination (e.g., VM3 133 or VM4 134). In practice, any suitable logical overlay network tunneling protocol may be used for encapsulation, such as VXLAN, Network Virtualization using Generic Routing Encapsulation (NVGRE), Generic Network Virtualization Encapsulation (GENEVE), Stateless Transport Tunneling (STT), etc.

Broadcast Packet Suppression

In practice, some network protocols utilize broadcast to perform their functionalities, such as address assignment using DHCP, address resolution using ARP, etc. Conventionally, broadcast traffic is sent to all workloads within a broadcast domain. This increases resource consumption and causes scalability and security issues because the amount of broadcast traffic generally increases with the number of workloads within the broadcast domain. Further, such protocols may be vulnerable to security attacks. For example, ARP is a trusting protocol that lacks authentication, which makes it vulnerable to ARP poisoning/spoofing and security attacks such as man-in-the-middle, host impersonation, Denial of Service (DoS), etc.

In the examples in FIG. 4 and FIG. 5, VMs 131-136 connected to logical switch 410 in logical network 400 are located within the same broadcast domain. The flat architecture of logical network 400 reduces, if not avoids, the need for designing complex network topology to enforce forbidden forwarding paths 433-434 through layer-3 network isolation, such as by deploying VM2 132 and VM5 135 on a different network (e.g., 20.20.20.0/24) to isolate them from VM3 133. According to examples in the present disclosure, SDN controller 170 may configure virtual switches 115A-C to suppress broadcast packets within the broadcast domain.

Figure 6:
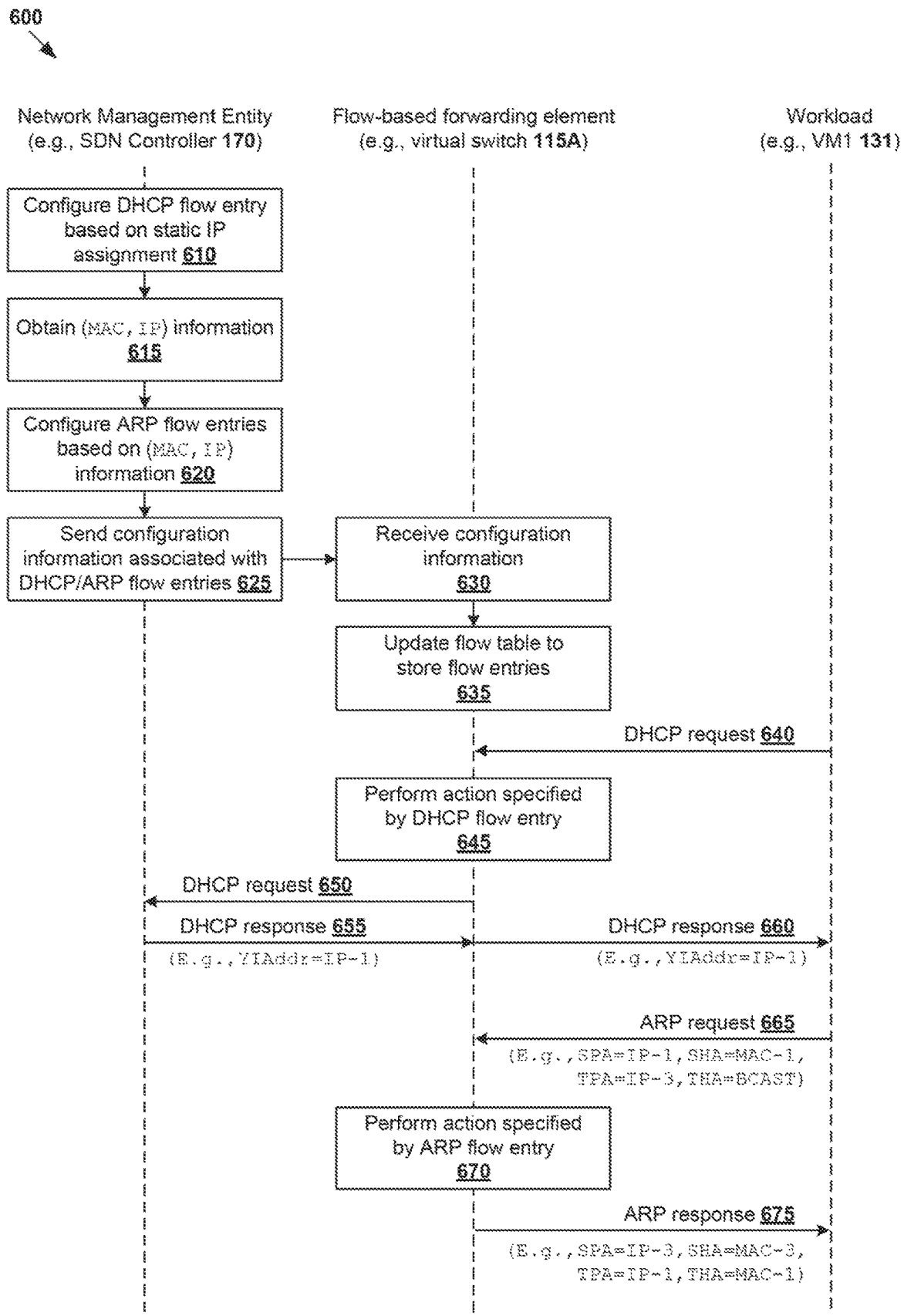
FIG. 6 is a flowchart of an example detailed process for configuring a flow-based forwarding element to handle broadcast packets in an SDN environment.

In more detail, FIG. 6 is a flowchart of example detailed process 600 for configuring a flow-based forwarding element to handle broadcast packets in SDN environment 100. Example process 600 may include one or more operations, functions, or actions illustrated at 610 to 675. The various operations, functions or actions may be combined into fewer blocks, divided into additional blocks, and/or eliminated depending on the desired implementation. FIG. 6 will be explained using FIG. 7, which is a schematic diagram illustrating example flow entries 700 for handling broadcast packets in SDN environment 100.

(a) Flow Entry Configuration

At 610 in FIG. 6, SDN controller 170 configures a flow entry specifying an action to handle DHCP requests without broadcasting them. Referring to FIG. 7, DHCP-related flow entry 710 specifies match fields (table=0, protocol=UDP, tp_src=68) to detect a DHCP request with source transport protocol port=68. If the match fields are satisfied, the DHCP request will be forwarded to SDN controller 170 according to "actions=CONTROLLER:65535" in DHCP-related flow entry 710. Note that match field "table=0" may be used to identify a particular flow table. In practice, multiple flow tables may be used to manage complex flow entries.

At 615 and 620 in FIG. 6, SDN controller 170 obtains address mapping information associated with VMs 131-136, and configures ARP-related flow entries based on the address mapping information. In the example in FIG. 7, flow entries 711-716 are generated based on hardware-to-protocol address mapping information, i.e., (IP-1, MAC-1) for VM1 131, (IP-2, MAC-2) for VM2 132, (IP-3, MAC-3) for VM3 133, (IP-4, MAC-4) for VM4 134, (IP-5, MAC-5) for VM5 135 and (IP-6, MAC-6) for VM6 136.

First entry 711 specifies an action to generate an ARP response with MAC-1 in response to detecting an ARP request for IP-1. Similarly, second entry 712 specifies an action to generate an ARP response with MAC-2 in response to detecting an ARP request for IP-2, third entry 733 specifies an action to generate an ARP response with MAC-3 in response to detecting an ARP request for IP-3, and so on. Although generally represented as "IP-n" and "MAC-n" in various flow entries for simplicity, IP and MAC addresses used in practice may be IP-n=10.10.10.n, MAC-1=10:54:00:27:27:5e, MAC-2=30:25:00:19:18:5f, etc.

At 625 in FIG. 6, SDN controller 170 generates and sends configuration information associated with DHCP- and ARP-related flow entries 710-716 to virtual switches 115A-C. At 630 and 635, in response to receiving the configuration information, virtual switches 115A-C updates respective flow tables 118A-C to add flow entries 710-716.

(b) Broadcast Packet Suppression

Blocks 640-660 are related to DHCP handling according to flow tables 118A-C. In particular, at 640 and 645 in FIG.

6, in response to detecting a DHCP request, virtual switches 115A-C may determine that the match fields in DHCP-related flow entry 710 are satisfied and perform the action accordingly. In particular, instead of generating any broadcast traffic, the DHCP request is sent to SDN controller 170 in a unicast manner.

In the example in FIG. 6, virtual switch 115A may detect a DHCP request (e.g., discover message) from VM1 131 to request for an IP address. Based on the static IP address IP-1=10.10.10.1 assigned to VM1 131 (see 315 in FIG. 3), SDN controller 170 may respond with a DHCP response (e.g., offer message) that specifies Your IP Address (YIAddr) field=IP-1. In response to receiving the DHCP response from SDN controller 170, virtual switch 115A forwards the DHCP response to VM1 131 (i.e., sender of the DHCP request). See 650, 655 and 660 in FIG. 6.

Blocks 665-675 are related to ARP handling according to flow tables 118A-C. An ARP request generally includes the following fields: source protocol address (SPA), source hardware address (SHA), target hardware address (THA) and target protocol address (TPA). Other fields (not shown in FIG. 6 for simplicity) may include such as hardware type (HTYPE) specifies the type of hardware address (e.g., HTYPE=1 for MAC address); protocol type (PTYPE) specifies the type of protocol address (e.g., PTYPE=0x0800 for IP version 6 (IPv4) address); hardware length (HLEN) specifies the hardware address length (e.g., HLEN=6 octets for a MAC address); protocol length (PLEN) specifies the protocol address length (e.g., PLEN=6 octets for an IPv4 address); and operation (OPER) specifies whether the packet is an ARP request (OPER=1) or ARP response (OPER=2).

Consider an example where VM1 131 wishes to communicate with VM3 133 (i.e., web server) and sends, via LP1 161, an ARP request to resolve a target IP address=IP-3 associated with VM3 133. At 665 in FIG. 6, virtual switch 115A detects an ARP request from VM1 131 that specifies SPA=IP-1, SHA=MAC-1, TPA=IP-3, THA=broadcast address (e.g., FF:FF:FF:FF:FF:FF). At 670 and 675 in FIG. 6, based on ARP-related entry 713 with match fields (arp, arp_tpa=IP-3) matching with the ARP request, virtual switch 115A generates an ARP response specifying (SPA=IP-3, SHA=MAC-3, TPA=IP-1, THA=MAC-1).

In practice, virtual switch 115A may perform block 670 by setting OPER=0x2 according to "load:0x2->NXM_OF_ARP_OPER[ ]" in the action field. Next, virtual switch 115A sets (SPA=IP-3, TPA=IP-1, THA=MAC-1) in the ARP response based on (SPA=IP-1, SHA=MAC-1, TPA=IP-3) in the ARP request. The relevant addresses are moved from "source" to "destination" according to "move:NXM_NX_ARP_SHA[ ]->NXM_NX_ARP_THA[ ], move:NXM_OF_ARP_SPA[ ]->NXM_OF_ARP_TPA[ ]." Further, SHA=MAC-3 in the ARP response is set according to "mod_dl_src:MAC-3, load: MAC-3->NXM_NX_ARP_SHA[ ]." Finally, the ARP response is sent to input port=LP1 161 via which the ARP request is received. Similarly, virtual switches 115A-C may handle ARP requests to resolve IP-2 into MAC-2 according flow entry 712, IP-3 into MAC-3 according to flow entry 713, and so on. Using flow entries 710-716, static responses to conventional ARP/DHCP requests may be generated, such as without the need for querying any cached information, etc.

According to examples of the present disclosure, a "top-down" approach (e.g., layer-7 to layer-4, layer-3) may be used for integrated network topology and security configuration. By configuring flow entries that facilitate communication over allowed forwarding paths and suppress broadcast packets within a broadcast domain, it is not necessary to configure complex network topology to provide layer-2 and/or layer-3 isolation among workloads. The "top-down" approach should be contrasted against conventional "bottom-up" approaches that necessitate disparate operations for network topology and security configuration. For example, this may involve network administrators creating a network topology that provides isolation among workloads, such as by deploying them on different virtual local area network (VLANs), etc. Security administrators then create security policies and firewall rules to allow/block communication among workloads. The complexity of such "bottom-up" approach (layer-2, layer-3 to layer-7) increases as the number of workloads increases.

Container Implementation

Although explained using VMs 131-136, it should be understood that "first workloads" and "second workloads" in the example in FIG. 2 may include other virtual workloads, such as containers, etc. Some examples will be described using FIG. 8, which is a schematic diagram illustrating example flow-based forwarding element configuration in an SDN environment with containers. In the following, some examples will be described using SDN controller 170 as an example "network management entity," containers C1 801 and C3 803 as example "first workloads," C2 802 as example "second workload," VM4 134 as example "destinations," virtual switches 115A-C as example "flow-based forwarding elements," etc.

As used herein, the term "container" (also known as "container instance") is used generally to describe an application that is encapsulated with all its dependencies (e.g., binaries, libraries, etc.). In the example in FIG. 8, container technologies may be used to run various containers 801-803 inside respective VMs 804-806. Containers 801-803 are "OS-less", meaning that they do not include any OS that could weigh 10s of Gigabytes (GB). This makes containers 801-803 more lightweight, portable, efficient and suitable for delivery into an isolated OS environment. Running containers inside a VM (known as "containers-on-virtual-machine" approach) not only leverages the benefits of container technologies but also that of virtualization technologies.

Containers C1 801, C2 802 and C3 803 may be executed as isolated processes inside respective VM7 804 on host-A 110A, VM8 805 on host-A 110A and VM9 806 on host-C 110C. Although one container is shown in each of VMs 804-806, it should be noted that a single VM may support multiple containers. According to the examples in FIG. 3, SDN controller 170 may configure logical network 800 with a flat architecture to connect containers 801-803 with database server VM4 134 via logical switch 410 (other VMs not shown for simplicity). Through static IP address assignment, containers 801-803 are assigned with respective IP-C1, IP-C2 and IP-C3 (see 811-813). Containers 801-803 are operated by respective users "Acc-1," "Acc-2" and "Acc-3" who are assigned with role="Accounts."

According to examples of the present disclosure, SDN controller 170 may configure virtual switches 115A-C using flow entries. At 210 in FIG. 2, SDN controller 170 obtains a set of security policies (see 820) associated with the group of workloads (e.g., containers 801-803). Security policies 821-822 may be arranged in an order of precedence. Second policy 822 blocks communication from C2 802 (i.e., "Acc-2") to VM4 134 (i.e., database server) and takes precedence over first policy 821, which allows communication between all "Accounts" members and VM4 134.

At 220 in FIG. 2, based on the set of security policies, SDN controller 170 identifies first allowed forwarding path 831 between VM4 134 and C1 801, and second allowed forwarding path 832 between VM4 134 and C3 803. At 230 in FIG. 2, SDN controller 170 configures a whitelist set of flow entries (see 840) that includes first flow entries 841-844 that each specify match fields and a first action to allow communication over allowed forwarding path 831-832. The match fields may include transport layer information and network layer information.

For example, the match fields in flow entries 841, 843 specify a connection tracking state (e.g., ct_state=−trk), protocol (e.g., TCP), an input port (e.g., in_port=LP-C1 or LP-C3), source network address (e.g., nw_src=IP-C1 or IP-C3), destination network address (e.g., nw_dst=IP-4 or IP-4), source port number (e.g., tp_src=8080). The action field in flow entries 841, 843 specify an output port (e.g., output:LP4) associated with VM4 134. Whitelist set 840 excludes any flow entry specifying an action to block communication over forbidden forwarding path 833 between VM4 134 and C3 802.

At 240 in FIG. 2, SDN controller 170 sends configuration information to virtual switch 115A/115C to configure virtual switch 115A/115C to apply flow entries 841-844 in whitelist set 840, or a subset thereof. During packet handling, in response to detecting an egress packet that is addressed from container 801/803 to VM4 134 and matches with flow entry 841/843, whitelist set 840 causes virtual switch 115A/115C to forward the egress packet.

In contrast, in response to detecting an egress packet that is addressed from container 802 to VM4 134 and does not match with any flow entry in whitelist set 840, virtual switch 115A drops the egress packet. Similar to the examples in FIG. 6 to FIG. 7, SDN controller 170 may configure virtual switches 115A-C to suppress broadcast packets using flow entries, such as DHCP- and ARP-related flow entries. Other examples and advantages explained using FIG. 1 to FIG. 7 are applicable to SDN environment 800 with containers 801-803 in FIG. 8, the details of which will not be repeated for brevity.

IoT Implementation

It should be understood that "first workloads" and "second workloads" in the example in FIG. 2 may include physical workloads, such as physical computer systems, physical devices in an IoT network environment, etc. In general, the "Internet of Things (IoT)" may refer generally to a network environment where a large number of objects (i.e., not just computer systems) may utilize communication services offered by network protocols (e.g., TCP/IP) to communicate with each other. Depending on the desired implementation, such objects (i.e., "IoT devices") which may have constraints on energy, memory, size, cost, etc.

Figure 9:
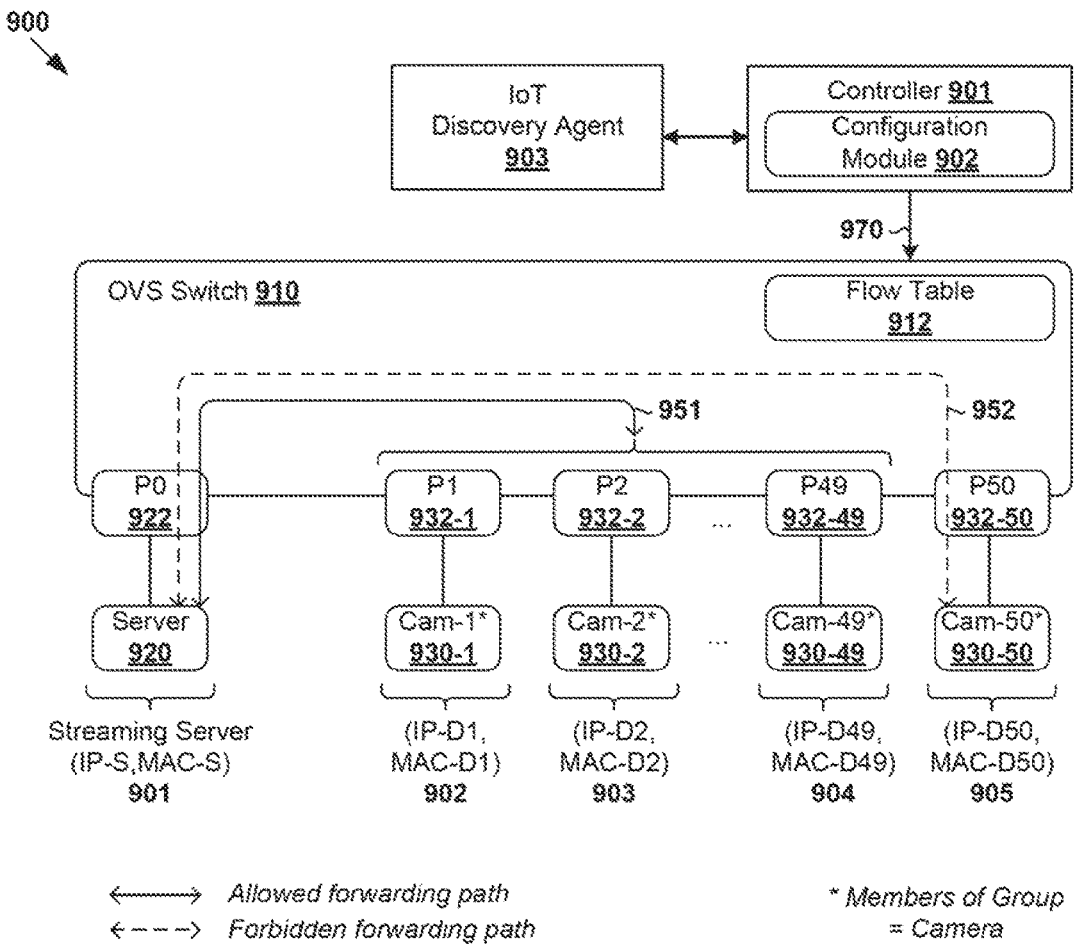
FIG. 9 is a schematic diagram illustrating example flow-based forwarding element configuration in a network environment with Internet of Things (IoT) devices.

FIG. 9 is a schematic diagram illustrating example flow-based forwarding element configuration 900 in a network environment with IoT devices. In FIG. 9, controller 901 is deployed as an example "network management entity," streaming server 920 as an example "destination," IoT devices in the form of cameras labelled "Cam-1" (see 930-1) to "Cam-49" (see 930-49) as example "first workloads," IoT device labelled "Cam-50" (see 930-50) as example "second workload," OVS switch 910 as an example "flow-based forwarding element," etc. IoT devices (see 930-1 to 930-50) and server 920 are connected to OVS switch 910 via respective ports P0 (see 922) and P2 to P50 (see 932-1 to 932-50). In practice, server 920 may be a remote server that is connected to OVS switch 910 via intermediate network device(s).

According to examples of the present disclosure, controller 901 (e.g., configuration module 902) may configure OVS switch 910 using flow entries. According to 210 in FIG. 2, controller 901 obtains a set of security policies (see 940) associated with the group of workloads (e.g., cameras 930-1 to 930-50). Security policies 941-942 may be arranged in an order of precedence. Second policy 942 blocks communication from "Cam-50" (see 930-50) to server 920 and takes precedence over first policy 941, which allows communication between all cameras and server 920.

At 220 in FIG. 2, based on the set of security policies, controller 901 identifies multiple allowed forwarding paths (generally indicated at 951) between server 920 and respective IoT devices labelled "Cam-1" (see 930-1) to "Cam-49" (see 930-49). In contrast, communication between server 920 and IoT device labelled "Cam-50" (see 930-50) is forbidden by second security policy 942. According to 230 in FIG. 2, controller 901 configures a whitelist set of flow entries (see 960) that includes flow entries 961-962, each specifying match fields and a first action to allow communication over allowed forwarding paths 951. The match fields may include transport layer information and network layer information.

Similarly, the match fields in flow entries 961-962 may facilitate matching up to transport layer or above For example, the match fields in flow entry 961 specifies a connection tracking state (e.g., ct_state=−trk), protocol (e.g., TCP), an input port (e.g., in_port=P2 to P49), source network address (e.g., nw_src=IP-D1 to IP-D49), destination network address (e.g., nw_dst=IP-S), source port number (e.g., tp_src=8080). The action field in flow entry 961 specifies an output port (e.g., output: P1) associated with server 920. Whitelist set 960 excludes any flow entry specifying an action to block communication over forbidden forwarding path 952 between server 920 and "Cam-50" (see 930-50).

According to 240 in FIG. 2, controller 901 sends configuration information to OVS switch 910 to configure OVS switch 910 to update flow table 912 with flow entries 961-962 in whitelist set 960, or a subset thereof. See also 970 in FIG. 9. During packet handling, in response to detecting an egress packet that is addressed from "Cam-1" (see 930-1) to server 920 via port=P1 (see 932-1) and matches with flow entry 961, whitelist set 960 causes virtual switch 115A/115C to forward the egress packet to port=P0 (see 922). The same applies to "Cam-2" (see 930-2) to "Cam-49" (see 930-49).

In contrast, in response to detecting an egress packet that is addressed from "Cam-50" (see 930-50) to server 920 and does not match with any flow entry in whitelist set 960, OVS switch 910 drops the egress packet. Similar to the examples in FIG. 6 to FIG. 7, controller 901 may configure OVS switch 910 to suppress broadcast packets using DHCP- and ARP-related flow entries. Since there is no broadcast flooding, this approach would suit IoT devices that have limited processing power. Other examples and advantages explained using FIG. 1 to FIG. 7 are applicable to IoT network environment 900 in FIG. 9, the details of which will not be repeated for brevity.

In some examples, whitelist set 960 may be configured after, and based on, a device type (e.g., camera) associated with a newly connected IoT device (e.g., "Cam-1" 932-1). For example in FIG. 9, IoT discovery agent 903 may be deployed in the network environment to perform IoT device discovery. In response to detecting or discovering an IoT device (e.g., "Cam-1" 932-1) that is newly connected to OVS switch 910, IoT discovery agent 903 may filter traffic through controller 901 (e.g., using action=controller) from the newly connected IoT device. IoT discovery agent 903 may then identify the IoT device using any suitable discovery protocol, such as Universal Plug and Play (UPnP), Simple Service Discovery Protocol (SSDP), etc. Once the IoT device is identified (e.g., "Cam-1" 932-1) as well as its associated device type (e.g., camera), controller 901 may generate whitelist set 960 based on security policies 940 associated with the group or device type. In practice, IoT discovery agent 903 may be implemented using any suitable approach, such as using a separate entity to controller 901 (as shown in FIG. 9), or a component of controller 901. During device discovery, IoT discovery agent 903 may also access any suitable device inventory information.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform processes described herein with reference to FIG. 1 to FIG. 9. According to the examples in FIG. 1 to FIG. 8, computer system(s) capable of performing as SDN controller 170, and hosts 110A-C may be deployed in SDN environment 100. According to the example in FIG. 9, computer system(s) capable of performing as controller 901, OVS switch 910, server 920, IoT devices 930-1 to 930-50 may be deployed in IoT network environment 900.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or other instructions to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

What is claimed is:

1. A method for a network manager to perform flow-based forwarding element configuration in a network environment that includes the network manager, a flow-based forwarding element, and a group of workloads, the method comprising:
obtaining a set of security policies associated with the group of workloads, wherein the set of security policies allows communication between a destination and a first workload from the group, but blocks communication between the destination and a second workload from the group;
based on the set of security policies, identifying an allowed forwarding path between the destination and the first workload;
configuring a whitelist set of flow entries that:
includes a first flow entry that specifies match fields and a first action to allow communication over the allowed forwarding path, but
excludes flow entries, associated with actions to block communications between the destination and the workloads, such that a second flow entry, which specifies a second action to block communication over a forbidden forwarding path between the destination and the second workload, is absent in the whitelist set and so communication between the destination and the second workload is automatically blocked due to the second flow entry being absent in the whitelist set,
wherein the flow entries included in the whitelist set are non-hierarchical and are configured based on the set of security policies prior to packet detection, and wherein the match fields include transport layer information and network layer information; and
sending configuration information to the flow-based forwarding element to cause the flow-based forwarding element to apply the whitelist set to:
in response to detecting a first packet that is addressed from the first workload to the destination and that matches with the match fields specified by the first flow entry, perform the first action to forward the first packet to the destination; and
in response to detecting a second packet that is addressed from the second workload to the destination and that does not match with any flow entry in the whitelist set, drop the second packet.

2. The method of claim 1, further comprising:
configuring a third flow entry that specifies an action to handle a broadcast packet; and
sending configuration information to the flow-based forwarding element to cause the flow-based forwarding element to apply the third flow entry to, in response to detecting the broadcast packet, perform the action without broadcasting the broadcast packet within a broadcast domain in which the group of workloads are located.

3. The method of claim 2, further comprising:
configuring the third flow entry to specify an action to, in response to detecting an address assignment request from the first workload or the second workload, forward the address assignment request to the network manager.

4. The method of claim 3, further comprising:
prior to configuring the third flow entry, assigning the group of workloads with a set of static network addresses, wherein the first workload is assigned with a first static network address and the second workload is assigned with a second static network address; and
in response to receiving the address assignment request from the first workload or the second workload via the flow-based forwarding element, generating and sending an address assignment response that specifies the first static network address or the second static network address.

5. The method of claim 2, further comprising:
obtaining mapping information that associates a first network address assigned to the first workload with a first hardware address; and
based on the mapping information, configuring the third flow entry to specify an action to, in response to detecting an address resolution request to resolve the first network address, generate an address resolution response that specifies the first hardware address.

6. The method of claim 1, wherein configuring the whitelist set comprises:
configuring the network layer information in the match fields of the first flow entry to include a first network address assigned to the first workload and a second network address assigned to the destination, wherein the first workload is a first virtualized computing instance and the destination is a second virtualized computing instance;
configuring the transport layer information in the match fields of the first flow entry to include a protocol, and a source port number, a destination port number, or both the source port number and the destination port number; and
configuring the match fields of the first flow entry to further include port information associated with an input port that connects the first workload to the flow-based forwarding element.

7. The method of claim 1, wherein configuring the whitelist set comprises:
configuring the network layer information in the match fields of the first flow entry to include a first network address assigned to the first workload and a second network address assigned to the destination, wherein the first workload is an Internet of Things (IoT) device and the first flow entry is configured based on a device type of the IoT device;
configuring the transport layer information in the match fields of the first flow entry to include a protocol, and a source port number, a destination port number, or both the source port number and the destination port number; and
configuring the match fields of the first flow entry to further include port information associated with an input port that connects the IoT device to the flow-based forwarding element.

8. The method of claim 1, wherein the match fields further include connection tracking state information to facilitate stateful filtering for the allowed forwarding path.

9. A non-transitory computer-readable storage medium that includes a set of instructions which, in response to execution by a processor of a computer system, cause the processor to perform a method of flow-based forwarding element configuration in a network environment that includes the computer system, a flow-based forwarding element, and a group of workloads, wherein the method comprises:
obtaining a set of security policies associated with the group of workloads, wherein the set of security policies allows communication between a destination and a first workload from the group, but blocks communication between the destination and a second workload from the group;
based on the set of security policies, identifying an allowed forwarding path between the destination and the first workload;
configuring a whitelist set of flow entries that:
includes a first flow entry that specifies match fields and a first action to allow communication over the allowed forwarding path, but
excludes flow entries, associated with actions to block communications between the destination and the workloads, such that a second flow entry, which specifies a second action to block communication over a forbidden forwarding path between the destination and the second workload, is absent in the whitelist set and so communication between the destination and the second workload is automatically blocked due to the second flow entry being absent in the whitelist set,
wherein the flow entries included in the whitelist set are non-hierarchical and are configured based on the set of security policies prior to packet detection, and wherein the match fields include transport layer information and network layer information; and
sending configuration information to the flow-based forwarding element to cause the flow-based forwarding element to apply the whitelist set to:
in response to detecting a first packet that is addressed from the first workload to the destination and that matches with the match fields specified by the first flow entry, perform the first action to forward the first packet to the destination; and
in response to detecting a second packet that is addressed from the second workload to the destination and that does not match with any flow entry in the whitelist set, drop the second packet.

10. The non-transitory computer-readable storage medium of claim 9, wherein the method further comprises:
configuring a third flow entry that specifies an action to handle a broadcast packet; and
sending configuration information to the flow-based forwarding element to cause the flow-based forwarding element to apply the third flow entry to, in response to detecting the broadcast packet, perform the action without broadcasting the broadcast packet within a broadcast domain in which the group of workloads are located.

11. The non-transitory computer-readable storage medium of claim 10, wherein the method further comprises:
configuring the third flow entry to specify an action to, in response to detecting an address assignment request from the first workload or the second workload, forward the address assignment request to the computer system.

12. The non-transitory computer-readable storage medium of claim 11, wherein the method further comprises:
prior to configuring the third flow entry, assigning the group of workloads with a set of static network addresses, wherein the first workload is assigned with a first static network address and the second workload is assigned with a second static network address; and
in response to receiving the address assignment request from the first workload or the second workload via the flow-based forwarding element, generating and sending an address assignment response that specifies the first static network address or the second static network address.

13. The non-transitory computer-readable storage medium of claim 10, wherein the method further comprises:
obtaining mapping information that associates a first network address assigned to the first workload with a first hardware address; and
based on the mapping information, configuring the third flow entry to specify an action to, in response to detecting an address resolution request to resolve the first network address, generate an address resolution response that specifies the first hardware address.

14. The non-transitory computer-readable storage medium of claim 9, wherein configuring the whitelist set comprises:
configuring the network layer information in the match fields of the first flow entry to include a first network address assigned to the first workload and a second network address assigned to the destination, wherein the first workload is a first virtualized computing instance and the destination is a second virtualized computing instance;
configuring the transport layer information in the match fields of the first flow entry to include a protocol, and a source port number, a destination port number, or both the source port number and the destination port number; and
configuring the match fields of the first flow entry to further include port information associated with an input port that connects the first workload to the flow-based forwarding element.

15. The non-transitory computer-readable storage medium of claim 9, wherein configuring the whitelist set comprises:
configuring the network layer information in the match fields of the first flow entry to include a first network address assigned to the first workload and a second network address assigned to the destination, wherein the first workload is an Internet of Things (IoT) device and the first flow entry is configured based on a device type of the IoT device;
configuring the transport layer information in the match fields of the first flow entry to include a protocol, and a source port number, a destination port number, or both the source port number and the destination port number; and
configuring the match fields of the first flow entry to further include port information associated with an input port that connects the IoT device to the flow-based forwarding element.

16. The non-transitory computer-readable storage medium of claim 9, wherein the match fields further include connection tracking state information to facilitate stateful filtering for the allowed forwarding path.

17. A computer system configured to perform flow-based forwarding element configuration in a network environment that includes the computer system, a flow-based forwarding element, and a group of workloads, the computer system comprising:
a processor; and
a non-transitory computer-readable medium having stored thereon instructions that, in response to execution by the processor, cause the processor to:
obtain a set of security policies associated with the group of workloads, wherein the set of security policies allows communication between a destination and a first workload from the group, but blocks communication between the destination and a second workload from the group;
based on the set of security policies, identify an allowed forwarding path between the destination and the first workload;
configure a whitelist set of flow entries that:
includes a first flow entry that specifies match fields and a first action to allow communication over the allowed forwarding path, but
excludes flow entries, associated with actions to block communications between the destination and the workloads, such that a second flow entry, which specifies a second action to block communication over a forbidden forwarding path between the destination and the second workload, is absent in the whitelist set and so communication between the destination and the second workload is automatically blocked due to the second flow entry being absent in the whitelist set,
wherein the flow entries included in the whitelist set are non-hierarchical and are configured based on the set of security policies prior to packet detection, and wherein the match fields include transport layer information and network layer information; and
send configuration information to the flow-based forwarding element to cause the flow-based forwarding element to apply the whitelist set to:
in response to detecting a first packet that is addressed from the first workload to the destination and that matches with the match fields specified by the first flow entry, perform the first action to forward the first packet to the destination; and
in response to detecting a second packet that is addressed from the second workload to the destination and that does not match with any flow entry in the whitelist set, drop the second packet.

18. The computer system of claim 17, wherein the instructions further cause the processor to:
configure a third flow entry that specifies an action to handle a broadcast packet; and
send configuration information to the flow-based forwarding element to cause the flow-based forwarding element to apply the third flow entry to, in response to detecting the broadcast packet, perform the action without broadcasting the broadcast packet within a broadcast domain in which the group of workloads are located.

19. The computer system of claim 18, wherein the instructions further cause the processor to:
configure the third flow entry to specify an action to, in response to detecting an address assignment request from the first workload or the second workload, forward the address assignment request to the computer system.

20. The computer system of claim 19, wherein the instructions further cause the processor to:
prior to configuring the third flow entry, assign the group of workloads with a set of static network addresses, wherein the first workload is assigned with a first static network address and the second workload is assigned with a second static network address; and
in response to receiving the address assignment request from the first workload or the second workload via the flow-based forwarding element, generate and send an address assignment response that specifies the first static network address or the second static network address.

21. The computer system of claim 18, wherein the instructions further cause the processor to:
obtain mapping information that associates a first network address assigned to the first workload with a first hardware address; and
based on the mapping information, configure the third flow entry to specify an action to, in response to detecting an address resolution request to resolve the first network address, generate an address resolution response that specifies the first hardware address.

22. The computer system of claim 17, wherein the instructions that cause the processor to configure the whitelist set cause the processor to:
configure the network layer information in the match fields of the first flow entry to include a first network address assigned to the first workload and a second network address assigned to the destination, wherein the first workload is a first virtualized computing instance and the destination is a second virtualized computing instance;
configure the transport layer information in the match fields of the first flow entry to include a protocol, and a source port number, a destination port number, or both the source port number and the destination port number; and
configure the match fields of the first flow entry to further include port information associated with an input port that connects the first workload to the flow-based forwarding element.

23. The computer system of claim 17, wherein the instructions that cause the processor to configure the whitelist set cause the processor to:
configure the network layer information in the match fields of the first flow entry to include a first network address assigned to the first workload and a second network address assigned to the destination, wherein the first workload is an Internet of Things (IoT) device and the first flow entry is configured based on a device type of the IoT device;
configure the transport layer information in the match fields of the first flow entry to include a protocol, and a source port number, a destination port number, or both the source port number and the destination port number; and
configure the match fields of the first flow entry to further include port information associated with an input port that connects the IoT device to the flow-based forwarding element.

24. The computer system of claim 17, wherein the match fields further include connection tracking state information to facilitate stateful filtering for the allowed forwarding path.

* * * * *